United States Patent
Nenasheva et al.

(10) Patent No.: US 6,887,812 B2
(45) Date of Patent: May 3, 2005

(54) CERAMIC MATERIAL BASED ON BISMUTH NIOBATE SUBSTITUTED WITH ZINC

(76) Inventors: Elizaveta Arkadievna Nenasheva, ul. Esenia, d.20, korp .2, kv. 88, St. Petersburg (RU), 194356; Nelli Fedorovna Kartenko, ul.Nalichnaya, d.37, korp.1, kv.39, St. Petersburg (RU), 199151

( * ) Notice: Subject to any disclaimer, the term of this patent is extended or adjusted under 35 U.S.C. 154(b) by 0 days.

(21) Appl. No.: 10/333,852
(22) PCT Filed: Jul. 5, 2001
(86) PCT No.: PCT/RU01/00287

§ 371 (c)(1),
(2), (4) Date: Sep. 29, 2003

(65) Prior Publication Data

US 2004/0053770 A1 Mar. 18, 2004

(30) Foreign Application Priority Data

Jul. 25, 2000 (RU) ........................ 2000120210

(51) Int. Cl.$^7$ ............................................ C04B 35/495
(52) U.S. Cl. ....................................................... 501/134
(58) Field of Search ........................................ 501/134

(56) References Cited

U.S. PATENT DOCUMENTS 4,638,401 A * 1/1987 Ling et al. ............... 361/321.4
5,183,786 A * 2/1993 Gejima et al. ............... 501/134
5,449,652 A * 9/1995 Swartz et al. ................ 501/134
6,136,739 A * 10/2000 Kim et al. .................... 501/134
6,180,547 B1 * 1/2001 Kim et al. .................... 501/134
6,395,663 B1 * 5/2002 Chen et al. ................... 501/134

* cited by examiner

*Primary Examiner*—Karl Group
(74) *Attorney, Agent, or Firm*—John D. Gugliotta

(57) ABSTRACT

The invention relates to ceramic materials based on bismuth niobate substituted with zinc and can be used for producing multilayer high frequency thermostable ceramic condensers provided with electrodes based on an alloy which comprises Ag and Pd, and also for producing multilayer microwave films. The aim of the invention is to develop a ceramic material having a low sintering temperature sufficient for using silver-palladium electrodes having a silver content of up to 90%. Said material has an optimum dielectric permittivity and thermostability which are sufficient for producing a wide range of items based on said material. Zinc niobate $ZnNb_2O_6$ having a structure of columbite with a quantity ranging from 7.0 to 99.0, expressed in mass %, is added into a ceramic material based on the bismuth niobate substituted with zinc having a crystal-chemical formula $(Bi^{2/3}[\ ]^{1/3})2(Zn<2+>^{1/3}Nd^{2/3})2O6[\ ]1,[\ ]$ being a vacancy with a pyrochlore structure. Glass having the following component ratio, in mass %, can be added into the material: PbO ranging from 26 to 33, Bi2 ranging from 14 to 24, $B_2O_3$ ranging from 4 to 10, $TiO_2$ ranging from 15 to 21, ZnO ranging from 21 to 28.

2 Claims, No Drawings

CERAMIC MATERIAL BASED ON BISMUTH NIOBATE SUBSTITUTED WITH ZINC

FIELD OF THE INVENTION

The invention relates to ceramic materials based on bismuth niobate substituted with zinc and can be used for producing multilayer high frequency thermostable ceramic condensers provided with electrodes based on an alloy which comprises Ag and Pd, and also for producing multilayer microwave filters.

BACKGROUND OF THE INVENTION

In production of condensers high frequency ceramic materials with sintering temperature not in excess of 1120° C. are applied, which makes it possible to use an Ag—Pd alloy, containing no more than 30% of Pd as inner electrodes of monolithic condensers. A set of modern requirements to radio electronic equipment makes high demands of such characteristics of ceramic materials as dielectric permeability which must provide the production of the whole range of rated values of ceramic condensers, including the low capacitance range which is possible only when the level of dielectric permeability does not exceed 40, the temperature coefficient of dielectric permeability and the tangent of the angle of dielectric losses (tg δ) or the factor of merit (Q~1/tg δ). The latter parameter is especially important for microwave filters.

A ceramic material for high frequency condensers is known with a temperature coefficient of capacitance within the range from $-30 \cdot 10^{-6} \text{deg.}^{-1}$ to $+30 \cdot 10^{-6} \text{deg.}^{-1}$, which contains a solid solution with formula $(Ba_{0.9} Sr_{0.1}) (Nd_{0.8} Bi_{0.2})_2 \cdot Ti_4 O_{12}$ and glass forming compound of borosilicate $xB_2O_3 \cdot ySiO_2$ used as an additive (see patent RU N 2035778, H 01 G 4/12).

Disadvantages of this material are high dielectric permeability which makes it impossible to produce on its base low capacitance multilayer ceramic condensers (several picofarads) and not low enough sintering temperature which prevents from using alloys with Pd content below 30% as electrodes for muitilayer condensers and filters.

Bismuth niobate substituted with magnesium, zinc and nickel are known with crystal chemical formula $(Bi_{2/3}[\ ]_{1/3})_2(Zn^{2+}{}_{1/3}Nd_{2/3})_2O_6)[\ ]_1$, where [ ] —a vacancy as high frequency condenser materials with high dielectric permeability (∈=145–148) at a temperature coefficient of dielectric permeability corresponding to groups M330 and M470 of thermostability and a low value of tangent of the angle of dielectric losses tg $\delta=(2–3) \cdot 10^{-4}$ (see patent RU N 2021207, C 01 G 33/00).

This technical solution is selected as a prototype of this invention.

Disadvantages of the prototype that make it impossible to solve our problem is relatively high sintering temperature which makes it necessary to use more expensive electrodes and low thermostability which prevents production of thermostable ceramic condensers and microwave filters on the base of this material.

DISCLOSURE OF THE INVENTION

The aim of the invention is to develop a ceramic material having a low sintering temperature sufficient for using silver-palladium electrodes having a silver content of up to 90%. The said material has an optimum dielectric permittivity and thermostability which are sufficient for producing a wide range of items based on said material.

According to the invention ceramic material based on bismuth niobate substituted with zinc having a crystal-chemical formula $(Bi_{2/3}[\ ]_{1/3})_2(Zn^{2+}{}_{1/3}Nb_{2/3})_2O_6[\ ]_1$ with a pyrochlore structure is characterized that zinc niobate $ZnNb_2O_6$ having a structure of columbite with a quantity ranging from 7.0 to 99.0, expressed in mass % is added to the said material. Glass having the following component ratio, in mass %, can be added into the material: PbO ranging from 26 to 33, $Bi_2O_3$ ranging from 14 to 24, $B_2O_3$- 4–10, $TiO_2$ ranging from 15 to 21, ZnO ranging from 21 to 28 in the amount of 0.1–5.0 mass %.

The Applicant did not find any sources that contain the information on similar technical solutions, which allows, in the Applicant's opinion, to make a conclusion that the invention meets the "Novelty" criterion (N).

By implementation of the distinguishing features of the invention (in combination with the features indicated in the restrictive part of formula of invention) new important properties of the subject are reached. In the technical solution proposed high values of all basic technical characteristics that determine the fitness of the material for using it in production of multi-layer high frequency condensers and filters are reached, that is sintering temperature, optimal permittivity and high thermostability.

The Applicant did not find any information on the influence of the distinguishing features of the invention on the technical result obtained. This allows to make a conclusion that the technical solution applied conforms to the "Invention standard" criterion (IS).

BRIEF DESCRIPTION OF DRAWINGS

Further the invention is explained by detailed description of examples of its implementation without any references to drawings.

DESCRIPTION OF THE PREFERRED EMBODIMENTS

The technique of producing the compound proposed is as follows. First niobate substituted with zinc with a pyrochlore structure is synthesized, next zinc niobate with a structure of columbite is synthesized. The components thus obtained are mixed and wet grinded glass is added, next it is dried and the invented material is obtained.

For the examples of synthesis of the invented compound see table 1.

For main technical characteristic of specimens of the materials obtained see table 2.

The analysis of the results shows that wide application of zinc niobate makes it possible to expand the series of new materials in a wide range of thermostable, and thermocompensating groups, ensures the possibility to produce a wide range of ceramic condensers, including the condensers belonging to the most advanced MПO group with electrodes containing not less than 30% of Pd and ensures the production of low capacitance thermostable ceramic condensers and thermostable microwave filters.

Specimens 1 through 8 correspond to thermostability groups П100, П33, MПO, M47 and M75, specimens 9 through 11- to thermocompensating groups M150, M220 and M330 in accordance to OST 110309-86 "Ceramic materials for development of electronic equipment. Specifications.".

Addition of glass of the said composition (RU, C1, 2035780) into the invented material ensures additional reduction of sintering temperature its range being widened, results in some decrease of thermostable and thermocompensating properties (in terms of the absolute value) and dielectric losses, improves technological properties of the material which is very important in production of multiplayer condensers and filters.

INDUSTRIAL APPLICABILITY

The proposed material can be obtained by industrial method with application of widespread materials, known techniques and technical aids which stipulates in the Author's opinion the conformity of the invention to the "Industrial applicability" criterion (IA).

TABLE 1

| Specimen No | Chemical composition, weight, % | | |
|---|---|---|---|
| | Bismuth niobate substituted with zinc | Zinc niobate $ZnNb_2O_6$ | Glass |
| 1 | 1.0 | 99.0 | 0.2 |
| 2 | 10.0 | 90.0 | 0.1 |
| 3 | 15.0 | 85.0 | — |
| 4 | 15.0 | 85.0 | 2.0 |
| 5 | 17.5 | 82.5 | 5.0 |
| 6 | 20.0 | 80.0 | 1.0 |
| 7 | 26.0 | 74.0 | 3.0 |
| 8 | 37.5 | 62.5 | 0.5 |
| 9 | 50.0 | 50.0 | 0.2 |
| 10 | 62.5 | 37.5 | 2.0 |
| 11 | 93.0 | 7.0 | 4.0 |

TABLE 2

| Specimen No | Dielectric permeability | Temperature coefficient of dielectric permeability, $TCE \cdot 10^0 \; deg^{-1}$ | Sintering temperature (Tsn), °C | Tangent of angle of dielectric losses, $tg\delta \times 10^4$ at f = 1 MHz | |
|---|---|---|---|---|---|
| | | | | 25° C. | 125° C. |
| 1 | 22 ... 23 | +118 ... +135 | 1040 ... 1060 | 0.2 ... 1.5 | 0.4 ... 3.0 |
| 2 | 27 ... 29 | +74 ... +86 | 1020 ... 1060 | 0.5 ... 1.0 | 0.8 ... 1.6 |
| 3 | 30 ... 32 | +44 ... +50 | 1000 ... 1060 | 0.6 ... 1.2 | 0.8 ... 1.6 |
| 4 | 29 ... 31 | +32 ... +38 | 980 ... 1040 | 0.4 ... 0.7 | 0.6 ... 1.0 |
| 5 | 31 ... 33 | −12 ... +7 | 960 ... 1060 | 0.2 ... 0.4 | 0.3 ... 0.8 |
| 6 | 32 ... 34 | 0 ... +10 | 980 ... 1040 | 0.4 ... 0.6 | 0.5 ... 0.8 |
| 7 | 35 ... 37 | −22 ... −24 | 960 ... 1060 | 0.1 ... 0.5 | 0.2 ... 1.0 |
| 8 | 41 ... 43 | −73 ... −80 | 1020 ... 1060 | 0.5 ... 0.1 | 0.9 ... 1.7 |
| 9 | 81 ... 84 | −144 ... −162 | 1020 ... 1060 | 1.2 ... 1.5 | 1.2 ... 2.0 |
| 10 | 98 ... 101 | −215 ... −240 | 980 ... 1060 | 1.1 ... 1.5 | 2.0 ... 2.5 |
| 11 | 132 ... 140 | −315 ... −350 | 980 ... 1040 | 0.6 ... 2.0 | 2.0 ... 3.0 |

What is claimed is:

1. Ceramic material based on bismuth niobate substituted with zinc having a crystal-chemical formula $(Bi_{2/3}[\;]_{1/3})_2 (Zn^{2+}{}_{1/3}Nb_{2/3})_2O_6[\;]_1$ with a pyrochlore structure is characterized that zinc niobate $ZnNb_2O_6$ having a structure of columbite with a quantity ranging from 7.0 to 99.0, expressed in mass % is added to the said material
   wherein [ ] is a normally occupied lattice site from which an atom or ion is missing.

2. The Ceramic material of claim 1, characterized that glass having the following component ratio, in mass %, is added into the material: PbO ranging from 26 to 33, $Bi_2O_3$ ranging from 14 to 24 $B_2O_3$ ranging from 4 to 10, $TiO_2$ ranging from 15 to 21, ZnO ranging from 21 to 28 in the amount of 0.1–5.0 mass %.

\* \* \* \* \*

UNITED STATES PATENT AND TRADEMARK OFFICE
CERTIFICATE OF CORRECTION

PATENT NO. : 6,887,812 B2
APPLICATION NO. : 10/333852
DATED : May 3, 2005
INVENTOR(S) : Nenasheva et al.

It is certified that error appears in the above-identified patent and that said Letters Patent is hereby corrected as shown below:

In the Abstract:
    line 3, delete "condensers" and replace with capacitors
    line 6, delete "films" and replace with filters
    line 12, delete "ZnNb2O6" and replace with ZnNb2O6
    line 15-16, delete "( Bi2/3[ ]1/3)2(Zn<2+>1/3Nd2/3)2O6[ ]1" and replace with (Bi2/3 [ ]1/3)2(Zn1/3Nb2/3)2O6[ ]1
    line 19, delete "Bi2" and replace with Bi2O
    line 19, delete "B2O3" and replace with B2O3
    line 20, delete "TiO2" and replace with TiO2
    in the last line, after "21 to 28" please add in the amount of 0.1-5.0 mass%

In the Specification

Column 1, lines 9, 14, 18, 22, 29, 38, 40, 56, please delete "condensers" and replace with capacitors
    Column 1, line 20, 24, 36, 45, 46, delete "permeability" and replace with permittivity
    Column 1, line 17, delete "no more" and replace with less
    Column 1, line 26, delete "the factor of merit" and replace with the quality factor and delete (twice) "tgδ" and replace with tan δ
    Column 1, line 33, delete "$(Ba_{0.9}Sr_{0.1})(Nd_{0.8}Bi_{0.2})_2 \cdot Ti_4O_{12}$" and replace with $(Ba_{0.9}Sr_{0.1})(Nd_{0.8}Bi_{0.2})_2Ti_4O_{12}$
    Column 1, line 43, delete "Nd" and replace with Nb
    Column 1, line 45, delete "€ = 145-148" and replace with ε = 145-148
    Column 1, line 48, delete "tg δ" and replace with tan δ
    Column 2, line 18, 44 (twice) and 47, please delete "condensers" and replace with capacitors
    Column 2, line 45, delete "belonging to the most advanced MΠO group with electrodes" and replace with belonging to the most advanced NPO group with electrodes
    Column 2, line 46, delete "not less than 30%" and replace with less than 30%

UNITED STATES PATENT AND TRADEMARK OFFICE
CERTIFICATE OF CORRECTION

PATENT NO. : 6,887,812 B2
APPLICATION NO. : 10/333852
DATED : May 3, 2005
INVENTOR(S) : Nenasheva et al.

It is certified that error appears in the above-identified patent and that said Letters Patent is hereby corrected as shown below:

Column 2, lines 50-52 delete "groups ⊓100, ⊓33, M⊓O, M47 and M75, specimens 9 through 11- to thermocompensating groups M150, M220 and M330 in accordance to OST 110309-68 "Ceramic" and replace with groups P100, P33. NPO, N47 and N75, specimens 9 through 11 – to thermocompensating groups N150, N220 and N330 in accordance to OST 110309-86 <<Ceramic...

Column 2, line 61, delete "multiplayer condencers" and replace with multiplayer capacitors In Table 2, delete "permeability" (twice) and replace with permittivity (twice), delete "$T_{sn}$" and replace with $T_{sin}$, delete "tg δ" and replace with tan δ.

p. 3 Column 2, line 42, delete "14 to 24 $B_2O_3$" and replace with 14 to 24, $B_2O_3$...

Signed and Sealed this

Fourteenth Day of October, 2008

JON W. DUDAS
*Director of the United States Patent and Trademark Office*